US011498530B2

(12) United States Patent
Schmalzel, Jr.

(10) Patent No.: US 11,498,530 B2
(45) Date of Patent: Nov. 15, 2022

(54) INLINE VERTICAL TACK-OFF MACHINE FOR AUTOMOBILE SIDE PANELS

(71) Applicant: Dennis George Schmalzel, Jr., Chesterfield, MI (US)

(72) Inventor: Dennis George Schmalzel, Jr., Chesterfield, MI (US)

(73) Assignee: LAMINAIR SYSTEMS INC, Chesterfield, MI (US)

( * ) Notice: Subject to any disclaimer, the term of this patent is extended or adjusted under 35 U.S.C. 154(b) by 280 days.

(21) Appl. No.: 16/632,535

(22) PCT Filed: Jul. 21, 2018

(86) PCT No.: PCT/US2018/043203
§ 371 (c)(1),
(2) Date: Jan. 20, 2020

(87) PCT Pub. No.: WO2019/018834
PCT Pub. Date: Jan. 24, 2019

(65) Prior Publication Data
US 2020/0198593 A1 Jun. 25, 2020

Related U.S. Application Data

(60) Provisional application No. 62/535,737, filed on Jul. 21, 2017.

(51) Int. Cl.
*B60S 3/06* (2006.01)
*B60S 3/04* (2006.01)

(52) U.S. Cl.
CPC .................. *B60S 3/063* (2013.01); *B60S 3/06* (2013.01); *B60S 3/04* (2013.01)

(58) Field of Classification Search
CPC ............... B60S 3/06; B60S 3/04; B60S 3/063
See application file for complete search history.

(56) References Cited

U.S. PATENT DOCUMENTS

| | | | | |
|---|---|---|---|---|
| 1,988,665 A | * | 1/1935 | Ross ....................... | B60S 3/063 |
| | | | | 15/53.3 |
| 3,090,981 A | * | 5/1963 | Vani ....................... | B60S 3/063 |
| | | | | 15/53.3 |
| 4,039,014 A | * | 8/1977 | Sellars ..................... | B60S 3/06 |
| | | | | 15/53.3 |

(Continued)

*Primary Examiner* — Michael D Jennings
(74) *Attorney, Agent, or Firm* — Singh Law Firm PLLC; Gautam Bir Singh

(57) ABSTRACT

An inline vertical tack-off system for cleaning vehicular bodies that eliminates the need to spatially dispose rotating brushes and thereby enhance the cleaning efficiency while reducing the space occupied by the apparatus by vertically aligning a plurality of cleaning brushes to clean the full height of a vehicle body. Additionally, the apparatus includes a positioning system which allows the tack-off brushes to move in relation to any of a variety of vehicular bodies by adjusting the distance between the brushes and the vehicle body under the control of a program, as well as by controlling the tilt of the brushes match the vehicle contours and thereby optimize the contact force applied by the brushes to the vehicular surface being cleaned. Also, the system includes a vortex enhanced plenum utilized to evacuate ambient air and contaminant particles.

16 Claims, 14 Drawing Sheets

(56) References Cited

U.S. PATENT DOCUMENTS

| | | | | |
|---|---|---|---|---|
| 5,461,745 A | * | 10/1995 | Nittoli | A46B 13/005 |
| | | | | 15/97.3 |
| 5,524,329 A | * | 6/1996 | Schmalzel | B60S 3/06 |
| | | | | 15/312.1 |
| 2014/0366290 A1 | * | 12/2014 | Belanger | F21S 4/20 |
| | | | | 15/53.1 |

* cited by examiner

INLINE VERTICAL TACK-OFF MACHINE FOR AUTOMOBILE SIDE PANELS

CROSS-REFERENCE

The application claims the benefits of U.S. Provisional Patent Application Ser. No. 62/535,737 filed on Jul. 21, 2017, by Inventor Dennis George Schmalzel, Jr., which is incorporated herein by reference.

TECHNICAL FIELD

This invention relates generally to a cleaning apparatus for the removal of dust, lint, and other particulate matter from surfaces prior the painting, lacquering or other coating thereof. The present invention relates to an automated space saving inline tacking machine for cleaning motor vehicle body prior to painting.

BACKGROUND OF THE INVENTION

As contaminants can produce a variety of blemishes in the final painted finish on vehicles, it is very important to remove dust, lint and other such particulate matter from surfaces prior to their painting. Particularly in large areas, such as vehicular panels, where even small imperfections in the painting process can eventually cause rust spots, cleaning becomes particularly important.

A high-quality painted finish is needed for manufacturing of motor vehicles where an apparatus is placed on the assembly line and can perform the cleaning process in a streamlined and efficient manner as the vehicle passes therethrough prior to the vehicle reaching the paint robots. Thus, it is desirable that any cleaning process be compatible with high volume automated manufacturing techniques. It is also important that the pre-painting cleaning process not mar the vehicle or introduce any new contaminants.

Originally, pre-painting cleaning was carried out by wiping the surfaces with cloths impregnated with a tacky material, and hence, all such cleaning processes are generally referred to as "tacking" or "tack-off" processes. Cloth based processes have been found to be generally unsatisfactory, and therefore brush based systems, with the brushes utilizing ostrich feathers, are currently being utilized with a rotating brush which is swept across the surface to be cleaned.

The brush removes dust particles that are collected by a vacuum. One such prior art system particularly adapted for cleaning motor vehicle bodies is shown in U.S. Pat. No. 5,524,329. One of the problems with the system is the secondary contamination. As the brushes do not present an inline alignment, the brush that comes into contact with the vehicle later deposits contaminants on the vehicle surface previously cleaned. Furthermore, the non-inline design occupies more area on the assembly line where the space is at a premium.

It is also most important that any tack-off machine not introduce any new contaminants to the cleaned vehicle surface. In many tack-off machines in prior art, the vacuum collection system includes several flexible conduits and as such can blow secondary contaminants in previously cleaned areas.

The present invention recognizes that it is important to properly position the brushes in relation to each other so that they work in cooperation with each other and that the entire height of the vehicle comes into contact with the brushes at the same time which becomes possible when the brushes are disposed in a vertically inline configuration. As will be described in greater detail hereinbelow, the present invention provides an improved tack-off machine that accurately controls the position and the orientation of the brushes using a plurality of actuators that engage the brush surfaces with the vehicle body to create a contact zone along the entire height of the vehicle with the contact zone being 1.5-2.5 inches thick to maximize cleaning effect while minimizing the possibility of marring the vehicular surface. The machine of the present invention also provides improved cleaning efficiency and prevents recontamination of the cleaned surface by optimizing the configuration of collection conduits. These and other advantages of the present invention will be clear from the drawings, discussion and description which follow.

SUMMARY OF FEATURES OF EMBODIMENTS OF THE INVENTION

There is disclosed herein a vertical inline tack-off machine which includes a pair of cylindrical tack-off brushes rotatable about an axis thereof, having an exhaust hood surrounding a portion of the circumference of the brush and an exhaust plenum in communication with the hood, where the brushes are stacked over each other. The stacked pair of brushes may also be staggered such that the brushes move along a primary axis and a secondary axis substantially parallel to each other but perpendicular to the path of the vehicle being cleaned. The staggered design allows the brushes to come into contact with the vehicle at predetermined locations depending upon the CAD models and the geometry of the vehicle being cleaned. Furthermore, the cleaning brushes can be tilted about an axis that is orthogonal to both the primary and secondary axes and is in the plane containing the primary and the secondary axes.

The movement in the primary axis is effectuated by attaching the lower brush assembly to a primary tray that linearly slides within the enclosure powered with a primary tray actuator controlled by a computer program. The movements in the secondary axis are effectuated by attaching an upper brush assembly to a secondary tray that slides within the guiderails attached to the primary tray powered by a secondary tray actuator under the control of a computer program. Finally, a tilt actuator is mounted on the secondary tray which is attached to a variable length linkage to the upper brush assembly. As the length of linkage is increased or decreased by tilt actuator under the control of a computer program, the amount of tilt of the upper brush assembly is varied to accommodate the curvature of the upper body of vehicle so that the upper brush assembly can maintain good contact with the vehicle surface being cleaned.

The design of the exhaust plenums in communication with the hood partially enclosing the brushes is configured so that when air is drawn through the exhaust slot and out of the exhaust port, a variable region of turbulent flow is created in the interior volume. The turbulent flow has a maximum value proximate to the exhaust port and a minimum value when distal from the exhaust port. This turbulent flow creates a variable choke effect along the length of the slot so that the velocity of the air flowing there through is constant along the length. This plenum design disclosed in U.S. Pat. No. 5,524,329 is incorporated herein by reference.

BRIEF DESCRIPTION OF DRAWINGS

The invention will be described in conjunction with the attached drawings in which referenced numerals designate elements, and wherein.

DETAILED DESCRIPTION

Figure 1:
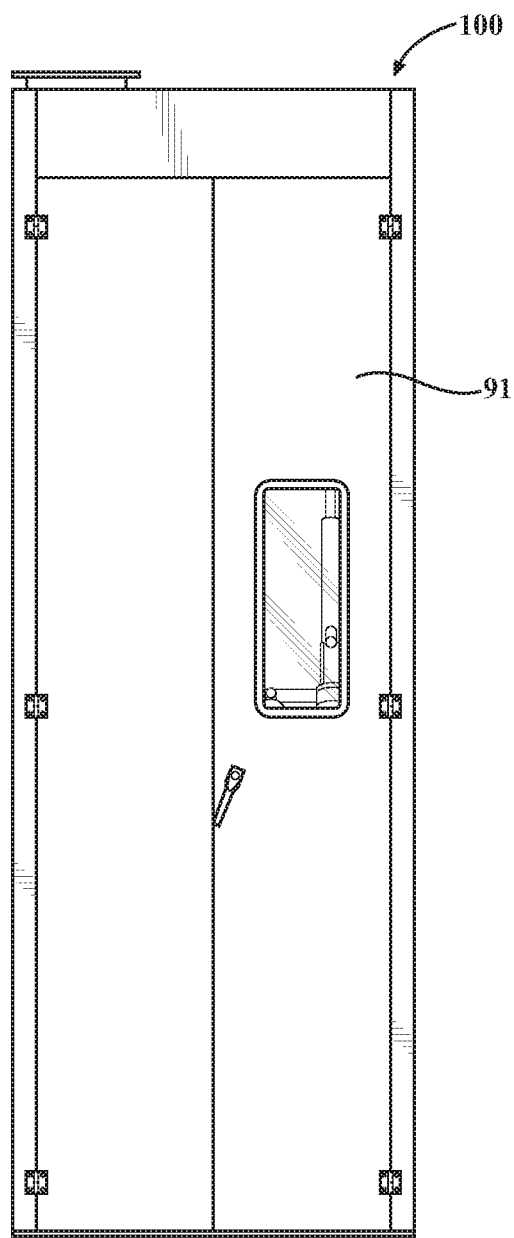
FIG. 1 represents the side view of the Inline Vertical Tack-Off Machine.

FIG. 1 represents the side view of the Inline Vertical Tack-Off Machine 100. This view illustrates the space saving and the stackable design of the Inline Vertical Tack Off Machine 100 shown with its Outer Cover 91. The invention offers significant advantages over the prior art. Instead of the side brushes being laterally displaced and configured vertical locations along the length of the vehicle being tacked off before painting, the machine utilizes brushes that are configured along the common vertical axis. This offers two significant advantages. First, it reduces the square shop floor footprint of the tack-off machine. And secondly, it enhances cleaning efficiency. When two side brushes are laterally displaced and not displaced along a common vertical axis, the brushes will come into contact with the vehicle sequentially. And as such the brush that comes into contact later would cause debris to be dissipated and get deposited on the area that was previously cleaned by the first brush.

Figure 2:
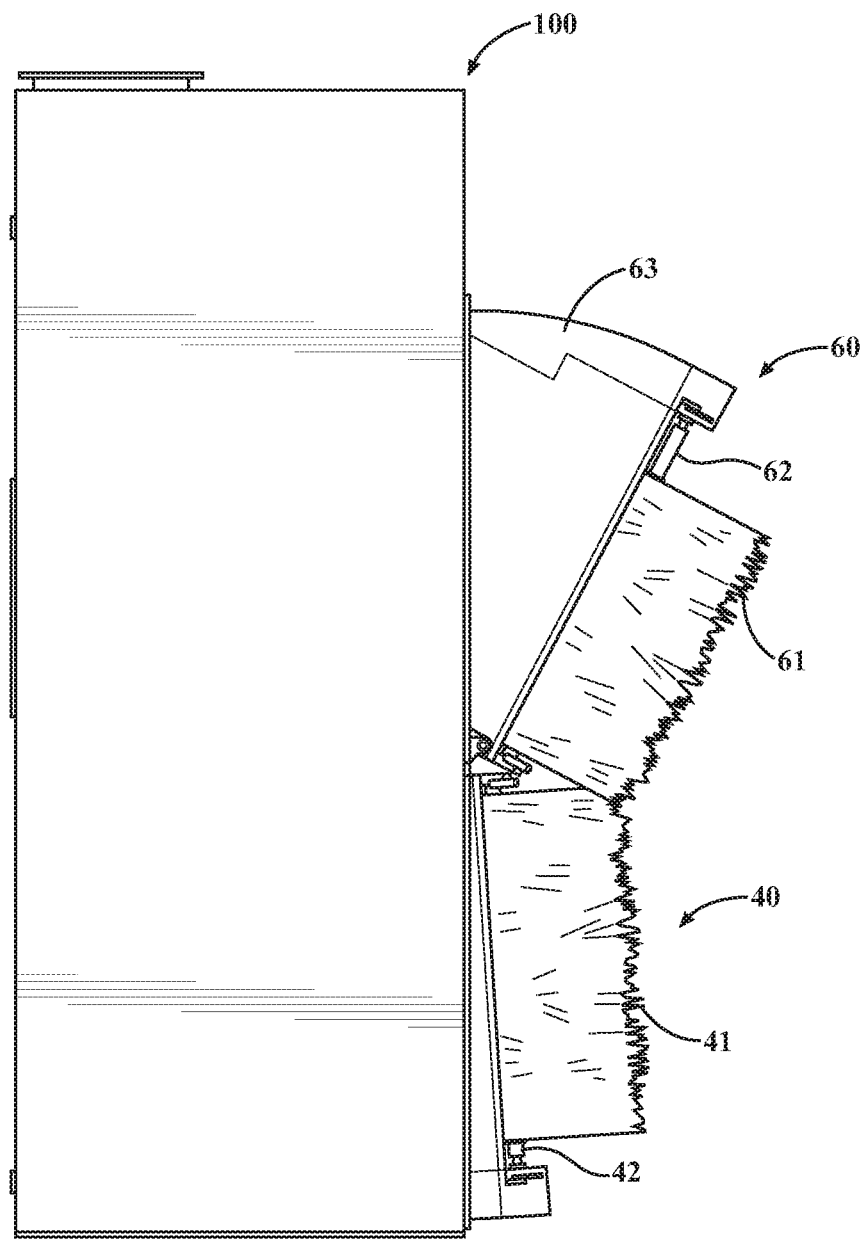
FIG. 2 depicts the side view of the machine with brushes partially engaged.

FIG. 2 depicts the side view of the machine with brushes partially engaged. The Upper Brush Assembly 60 comprises of an Upper Brush 61 which is adapted to rotate around an Upper Spindle 62 and enclosed within an Upper Hood Exhaust 63 and stacked over, and in vertical alignment with, a Lower Brush Assembly 40 also including a Lower Brush 41 rotating around a Lower Spindle 42 which are enclosed within a Lower Hood Exhaust 43.

Figure 3:
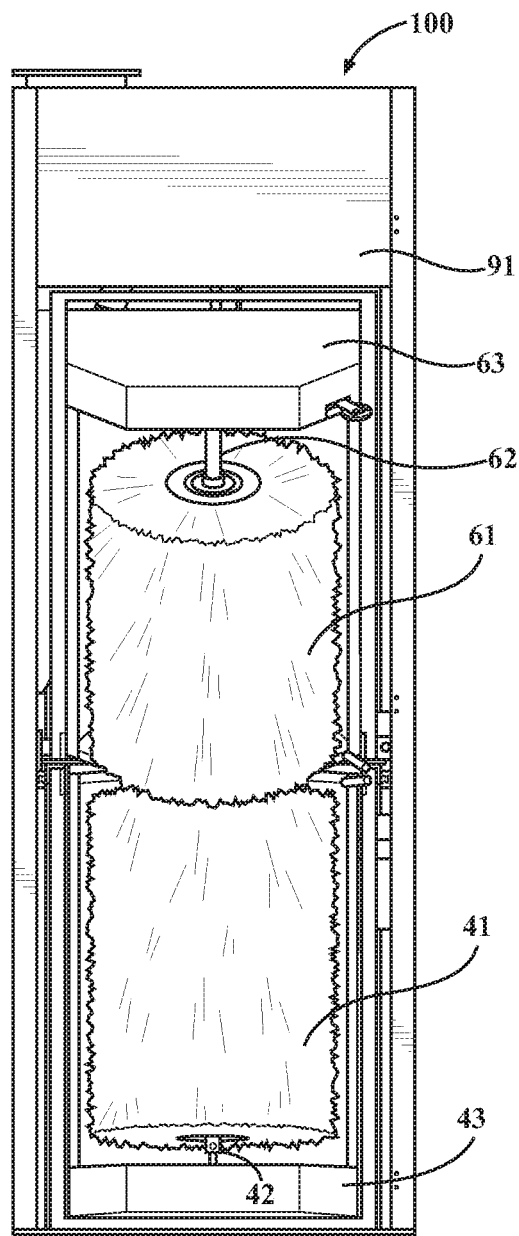
FIG. 3 illustrates the front view of the Inline Vertical Tack Off Machine.

FIG. 3 depicts the front view of the Inline Vertical Tack Off Machine 100. The brushes, the Upper Brush 61 and the Lower Brush 41 used in an embodiment of the invention shown are cylindrical tack-off brush rotatable about an axis thereof with an exhaust hood surrounding a portion of the circumference of the brush. In an embodiment of the invention, both the Lower Brush 41 and the Upper Brush 61 are substantially of the same radius enabling the Upper Brush Assembly 60 to stack on top of the Lower Brush Assembly 40 to optimize storage requirements and enhance tacking-off efficiency.

It will be appreciated by a skilled artisan that a single Inline Vertical Tack Off Machine 100 will clean one side of the vehicle, and a complementary pair of machines will each be disposed on either side of the vehicle as it moves along an assembly line to clean both sides prior to conveyor taking the vehicle to the painting booth. In addition to tacking off debris from the side of the vehicle, a separate apparatus is used for tacking off debris from the roof of the vehicle. One such prior art system to tack-off debris from the roof of the vehicle was shown in shown in U.S. Pat. No. 5,524,329 which is incorporated herein by reference.

Figure 4:
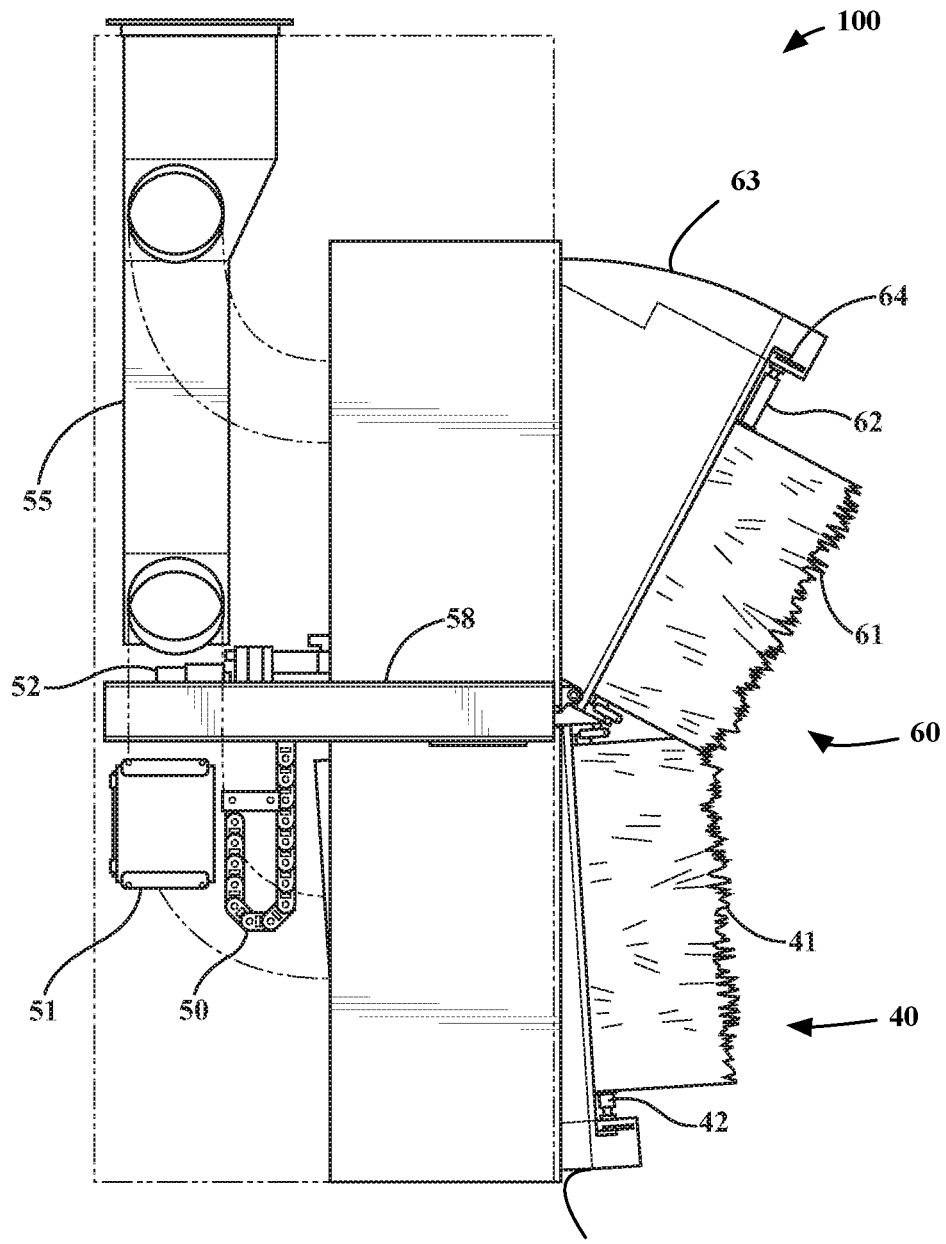
FIG. 4 shows the side view of the machine with a Photo-Eye and with outer cover removed and with duct work partially visible.

FIG. 4 shows the side view of the machine with a Photo-Eye and with outer cover removed and with duct work partially visible. The Outer Cover 91 is designed to protect the apparatus on a shop or factory floor. Further shown in FIG. 4 is an Exhaust Manifold 55 which is in communication with the Upper Hood Exhaust 63 and the Lower Hood Exhaust 43 through a plurality of exhaust ducts (shown with ghost lines). It is through the Exhaust Manifold 55 that the debris removed from the vehicle surface is dissipated. The CAT Track 50 shown is used for housing electrical cables that run throughout the interior of the Inline Vertical Tack Off Machine 100. The CAT Track Bracket 51 is designed and adapted to support the CAT Track 50.

Also shown in FIG. 4 is the Primary Tray Actuator 52 that is designed to control the linear movement of the Lower Brush Assembly 40 along a direction substantially parallel to the ground and towards or away from the vehicle body. Also depicted in FIG. 4 are Primary Tray Guide 58 used for guiding the movement of the Primary Tray 80 along a Primary Axis 75 under the control of the Primary Tray Actuator 52. A Photo Eye 64 is mounted on the Upper Brush Assembly 60 and is adapted to ensure that the clearance between body of the vehicle being tacked-off and the Upper Brush Assembly 60 is greater than a predefined threshold distance. One of the purposes of the Photo Eye 64 is thus to prevent any potential damage caused by a contact between the vehicle moving on the assembly line and the Upper Hood Exhaust 63.

An Inline Vertical Tack Off Machine 100 is disclosed comprising Lower Brush Assembly 40 including a lower hood having a shape of a hollow cylinder with a planar top surface and a planar bottom surface, curved surface, and an axis, having a lower opening on the curved surface of the lower hood with a spindle running along the axis of the lower hood; a Lower Brush 41 having a cylindrical shape adapted to fit inside of the lower hood wherein the Lower Brush 41 has a cavity adapted to accommodate the Lower Spindle 42 such that a rotational movement of the Lower Spindle 42 causes a corresponding rotational movement of the Lower Brush 41, and where the Lower Brush 41 is exposed through the lower opening; a Lower Hood Exhaust 43 in communication with the curved surface of the lower hood such that a passage exists therethrough from the lateral opening on the lower hood to the Lower Hood Exhaust 43; an Upper Brush Assembly 60 including an upper hood having a shape of a hollow cylinder with a planar top surface and a planar bottom surface, curved surface, and an axis, having an upper opening on the curved surface of the upper hood with a spindle running along the axis of the upper hood; an Upper Brush 61 having a cylindrical shape adapted to fit inside of the upper hood wherein the upper brush has a cavity adapted to accommodate the Upper Spindle 62 such that a rotational movement of the Upper Spindle 62 causes a corresponding rotational movement of the Upper Brush 61, and where the Upper Brush 61 is exposed through the upper opening; an Upper Hood Exhaust 63 in communication with the curved surface of the upper hood such that a passage exists therethrough from the lateral opening on the upper hood to the Upper Hood Exhaust 63; a Primary Tray 80 including a pivot and having an upper surface and a lower surface wherein the upper surface of the primary tray includes a plurality of guide rails; a Secondary Tray 89 including a pivot and having an upper surface and a lower surface adapted to slide within the guide rails of the Primary Tray 80 such that the lower surface Secondary Tray 89 faces the upper surface of the Primary Tray 80; and where the Lower Brush Assembly 40 is rotatably attached to the primary tray pivot and disposed below the lower surface of the primary tray, and the Upper Brush Assembly 60 is rotatably attached to the secondary tray pivot and disposed above the upper surface of the secondary tray. It will be appreciated by a skilled artisan that a rotatable attachment allows the Lower Brush Assembly 40 and the Upper Brush Assembly 60 to rotate about the pivot or a hinge.

Figure 5:
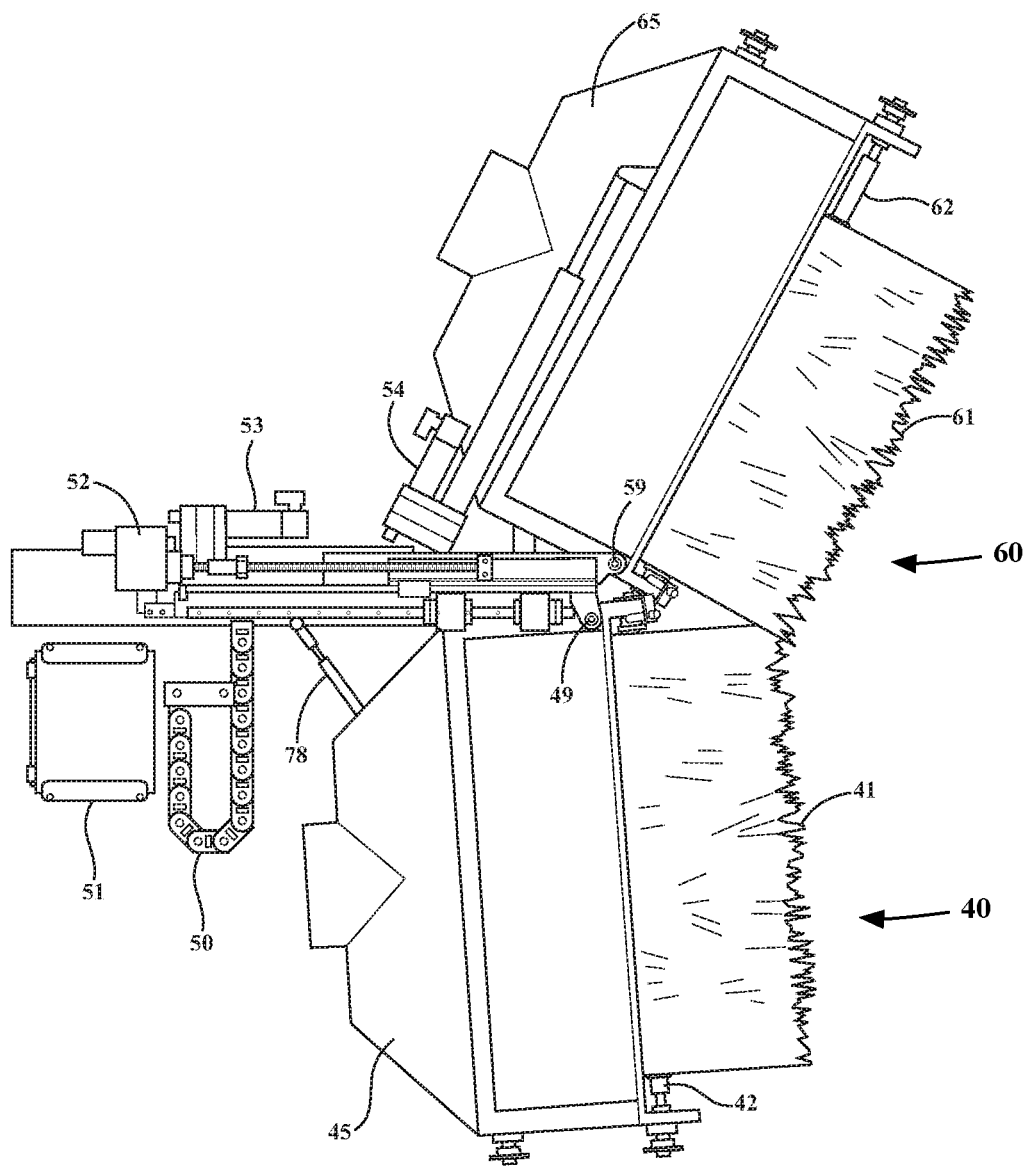
FIG. 5 is a side view of the machine depicting the configuration of the Actuators.

FIG. 5 is a side view of the machine depicting the configuration of the Actuators. The movement of the Lower Brush Assembly 40 is linear in the direction substantially parallel to the floor and designed to move it closer or away from the lower panels of the vehicle body. This movement is referred to be along a Primary Axis 75 and is controlled by Primary Tray Actuator 52 mounted externally. In an embodiment of the invention, the Primary Tray 80 is mounted on the housing of the Inline Vertical Tack Off Machine 100.

The Upper Brush Assembly 60 exhibits two degrees of freedom. It can move in a linear direction along and substantially parallel to the Primary Axis 75. This direction of movement, although parallel to the Primary Axis 75 is nonetheless an independent movement of the Upper Brush Assembly 60 and is referred to as the Secondary Axis 76. The linear movement of Upper Brush Assembly 60 along the Secondary Axis 76 is controlled by the Secondary Tray Actuator 53 mounted on the Primary Tray 80. In addition to the linear movements, the Upper Brush Assembly 60 can rotate about the Upper Brush Assembly Pivot 59. This rotation is controlled by the Tilt Actuator 54 mounted on the Secondary Tray 89.

FIG. 5 also depicts the Lower Exhaust Plenum 45 and the Upper Exhaust Plenum 65 which are in communication with the Exhaust Manifold 55 using a plurality of exhaust vents (not shown). A suction pressure is created in the Lower Exhaust Plenum 45 and the Upper Exhaust Plenum 65 causing vortex effect which transports back to the Exhaust Manifold 55 for disposal any debris collected from by tack-off operation of rotating brushes scrubbing the vehicle body.

Figure 6:
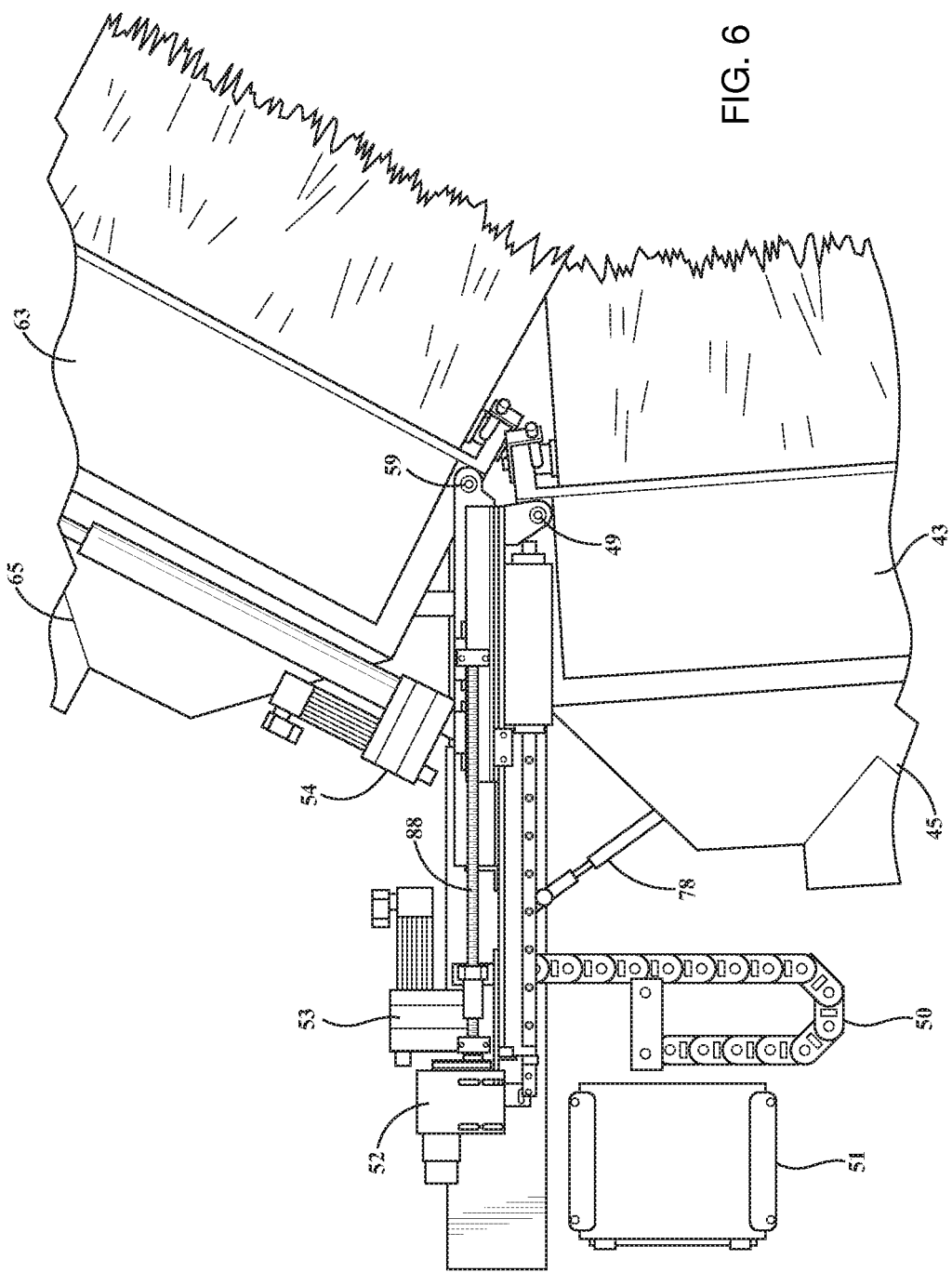
FIG. 6 is a detailed side view of the machine showing the Primary Axis Actuator, the Secondary Axis Actuator, and the Tilt Actuator

FIG. 6 is a detailed side view of the machine showing the Primary Axis Actuator, the Secondary Axis Actuator, and the Tilt Actuator. The Primary Tray Actuator 52 controls the movement of the Lower Brush Assembly 40 parallel to the floor enabling it to come into contact with the lower body panels. Also depicted is a Turn Buckle 78 that uses a threaded sleeve and a screw to adjust the orientation of the Lower Brush Assembly 40 about a Lower Brush Assembly Pivot 49. The sleeve can be turned over the screw to decrease or increase the length of the Turn Buckle 78 and thereby change the angle of contact between the Lower Brush 41 and the vehicle body. Thus, albeit not controlled through an actuator in the embodiment shown, the Lower Brush Assembly 40 also has a second degree of freedom of movement. It will be appreciated by a skilled artisan that the tilt movements of the Lower Brush Assembly 40 can be programmatically controlled by an actuator. The Secondary Tray Actuator 53 controls the linear movements of the Upper Brush Assembly 60 to enable its contact with the upper body panels of the vehicle. The movements effectuated by the Secondary Tray Actuator 53 are parallel to the floor as is the case for the movements effectuated by the Primary Tray Actuator 52. The Tilt Actuator 54 causes a rotation of the Upper Brush Assembly 60 about an axis parallel to the floor but perpendicular to the movements caused by the Primary Tray Actuator 52 and Secondary Tray Actuator 53.

Figure 7:
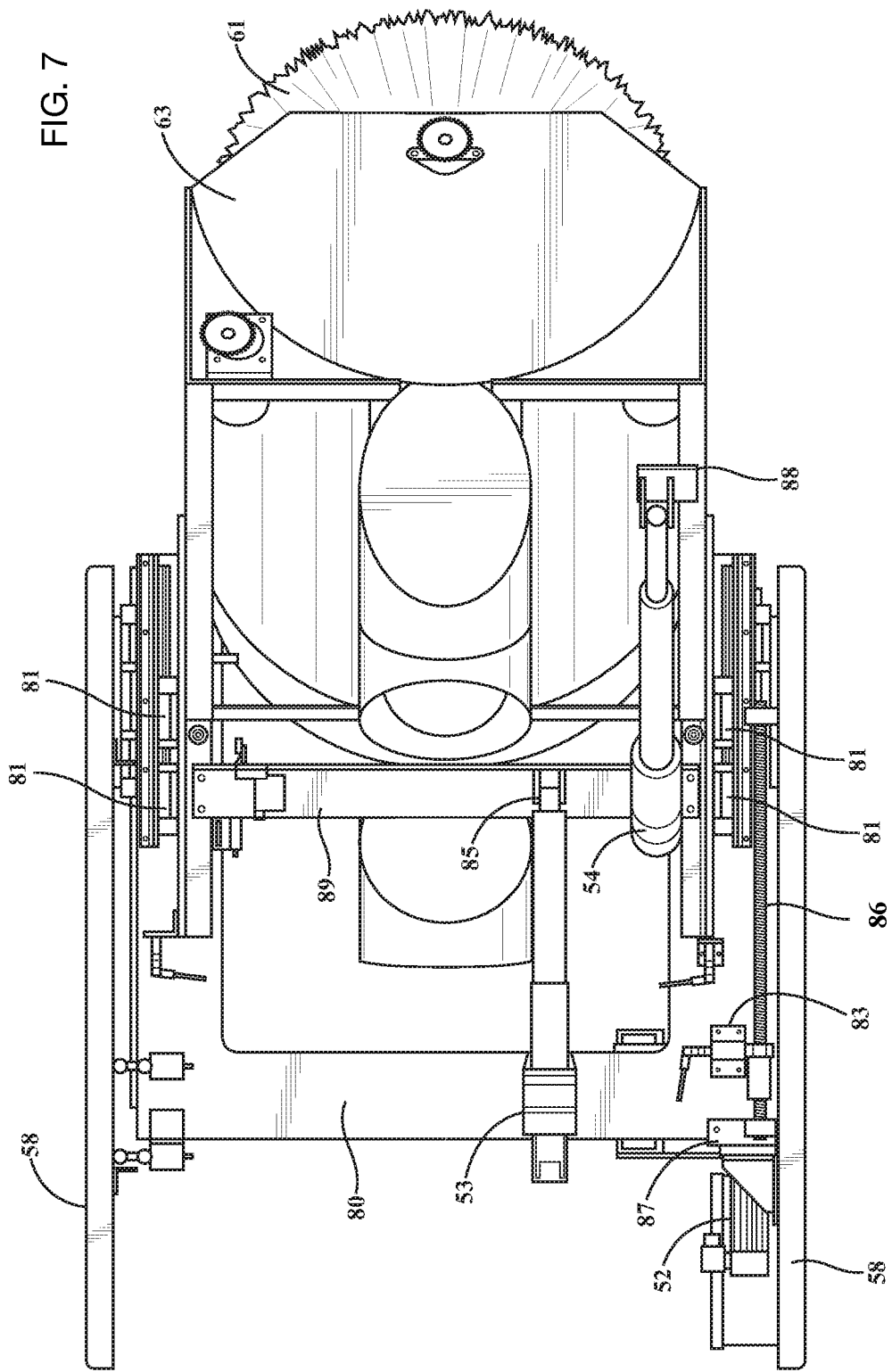
FIG. 7 depicts the top view of the machine showing the relative configuration of the rails enabling independent movement of the Upper Brush Assembly and Lower Brush Assembly.

FIG. 7 depicts the top view of the machine showing the relative configuration of the rails enabling independent movement of the Upper Brush Assembly and Lower Brush Assembly. The Primary Tray 80 is the surface upon which the assembly is constructed with the movements along the Primary Axis 75 being controlled by the Primary Tray Actuator 52 which is connected to a threaded Ball Screw 88 with a Ball Screw Mount 87 and engages the Ball Screw 88 which rotates in or out and thereby moves the Primary Tray Bracket 83 which is fixedly attached to the Primary Tray 80. The rotation of the Ball Screw 88 brought about the Primary Tray Actuator 52 is thus transformed into a linear movement by the Primary Tray Bracket 83 which in turn controls the movement of the Primary Tray 80 along the Primary Axis 75.

Movements along the Secondary Axis 76 are controlled by the Secondary Tray Actuator 53 housed upon and fixedly attached to the Primary Tray 80. The Secondary Tray Actuator 53 is adapted to linearly displace a Secondary Tray 89 along a Secondary Axis 76. The Secondary Tray Actuator 53 is removably attached to a Secondary Tray Actuator Bracket 85 which is fixedly attached to the Secondary Tray 89. The Secondary Tray 89 includes a plurality of Rail Block 81 elements that are guided by Secondary Tray Guide Rails 82 disposed on the Primary Tray 80 along either edge of the Secondary Tray 89. In this manner, the Secondary Tray Actuator 53 can move the Secondary Tray 89 linearly and parallel to the Primary Tray 80. The Upper Brush Assembly 60 mounted on the Secondary Tray 89 is thus able to be electronically controlled to be closer or farther away from the upper side panels of the vehicle body being cleaned and tacked-off.

The Upper Brush Assembly 60 can also be tilted in a Tilt Plane 77 that is perpendicular to Primary Tray 80 and Secondary Tray 89 and contains the Primary Axis 75 and the Secondary Axis 76—which in two axes are parallel to each other. The tilting movement is achieved by a Tilt Actuator 54 which is housed on the Secondary Tray 89 and is removably attached to Tilt Axis Actuator Bracket 86 that is fixedly attached to Upper Brush Assembly 60. When the actuator is engaged the Upper Brush Assembly 60 tilts about Upper Brush Assembly Pivot 59 and thereby changes the orientation and angle of contact between the Upper Brush 61 and the vehicle being tacked-off in preparation for paining.

An embodiment of the Inline Vertical Tack Off Machine 100 comprises a housing shaped substantially like a hollow rectangular prism having an open front face and an open back face disposed opposite from each other, and a pair of side surfaces each having an inside face and an outside face wherein each of the inside face includes a Primary Tray Guide 58 fixedly attached thereto, and a Primary Tray Actuator 52 fixedly attached to one of the surfaces; a Primary Tray 80 shaped substantially like a rectangle providing top surface and a bottom surface including a front edge, a back edge, and two side edges where the front edge and the back edge are disposed opposite to each other, further with front edge disposed inside the front face, and the back edge disposed inside the back face, the two side edges are disposed opposite to each other, side edges each includes a rolling artifact adapted to glide inside the Primary Tray Guide 58, a Primary Tray Bracket 83 fixedly attached to the top surface and having a threaded opening adapted to insert a Ball Screw 88 therethrough wherein the Ball Screw 88 has a first end and a second end with the first end of the Ball Screw 88 fixedly attached to the Primary Tray Actuator 52, a plurality of rolling artifacts fixedly attached to each side edge and adapted to slide within the Primary Tray Guide 58, a plurality of hinges, such as Lower Brush Assembly Pivot 49, fixedly attached to the bottom surface and disposed along the front edge where the hinges are adapted to accommodate a Lower Brush Assembly 40, where engaging the Primary Tray Actuator 52 is adapted to cause a linear displacement of the Primary Tray 80 along a Primary Axis 75.

An embodiment of the Inline Vertical Tack Off Machine 100 has the Primary Tray 80 further including a Secondary Tray Actuator 53 fixedly attached to the top surface, a pair of Secondary Tray Guide Rails 82 fixedly attached to the top surface and disposed along a configuration to be parallel to the primary tray side edges, the inline vertical tack off machine further including a Secondary Tray 89 shaped substantially like a rectangle providing top surface and a bottom surface including front edge, back edge, and two side edges where the front edge and the back edge are disposed opposite to each other, further with front edge disposed inside the front face, and the back edge disposed inside the back face, the two side edges are disposed opposite to each other, side edges each includes a rolling artifact, such as Rail Block 81, adapted to slide inside the Secondary Tray Guide Rails 82; a plurality of hinges such as Upper Brush Assembly Pivot 59 fixedly attached to the top surface and disposed along the front edge of the Secondary Tray 89 where the hinges are adapted to accommodate an Upper Brush Assembly 60; a Secondary Tray Actuator 53 bracket fixedly attached to the top surface of the Secondary Tray 89 and removably connected to a linkage having a first end and a second end wherein the first end of the linkage is connected to the Secondary Tray Actuator 53 and the second end of the linkage is connected to the Secondary Tray Actuator Bracket 85; where engaging the Secondary Tray Actuator 53 causes a linear movement of the Secondary Tray 89 along a Secondary Axis 76.

An embodiment of the Inline Vertical Tack Off Machine 100 wherein the Secondary Tray 89 further includes a Tilt Actuator 54 wherein the Tilt Actuator 54 is fixedly attached to the top surface of the Secondary Tray 89; a tilt linkage capable of changing a length and having a first end and a second end wherein the first end is fixedly attached to the Tilt Actuator 54; a tilt hinge assembly fixedly attached to the top brush assembly and adapted to accommodate the second end of the tilt linkage therein; where engaging the Tilt Actuator 54 causes the change of length of tilt linkage and a change in orientation of the Upper Brush Assembly 60 along a tilt axis. In an embodiment of the invention, the Primary Tray Actuator 52, the Secondary Tray Actuator 53 and the Tilt Actuator 54 are controlled by a computer program to correspondingly adjust the position of the Primary Tray 80 along the Primary Axis 75, the Secondary Tray 89 along the Secondary Axis 76, and the Upper Brush Assembly 60 orientation along the tilt axis.

Figure 8:
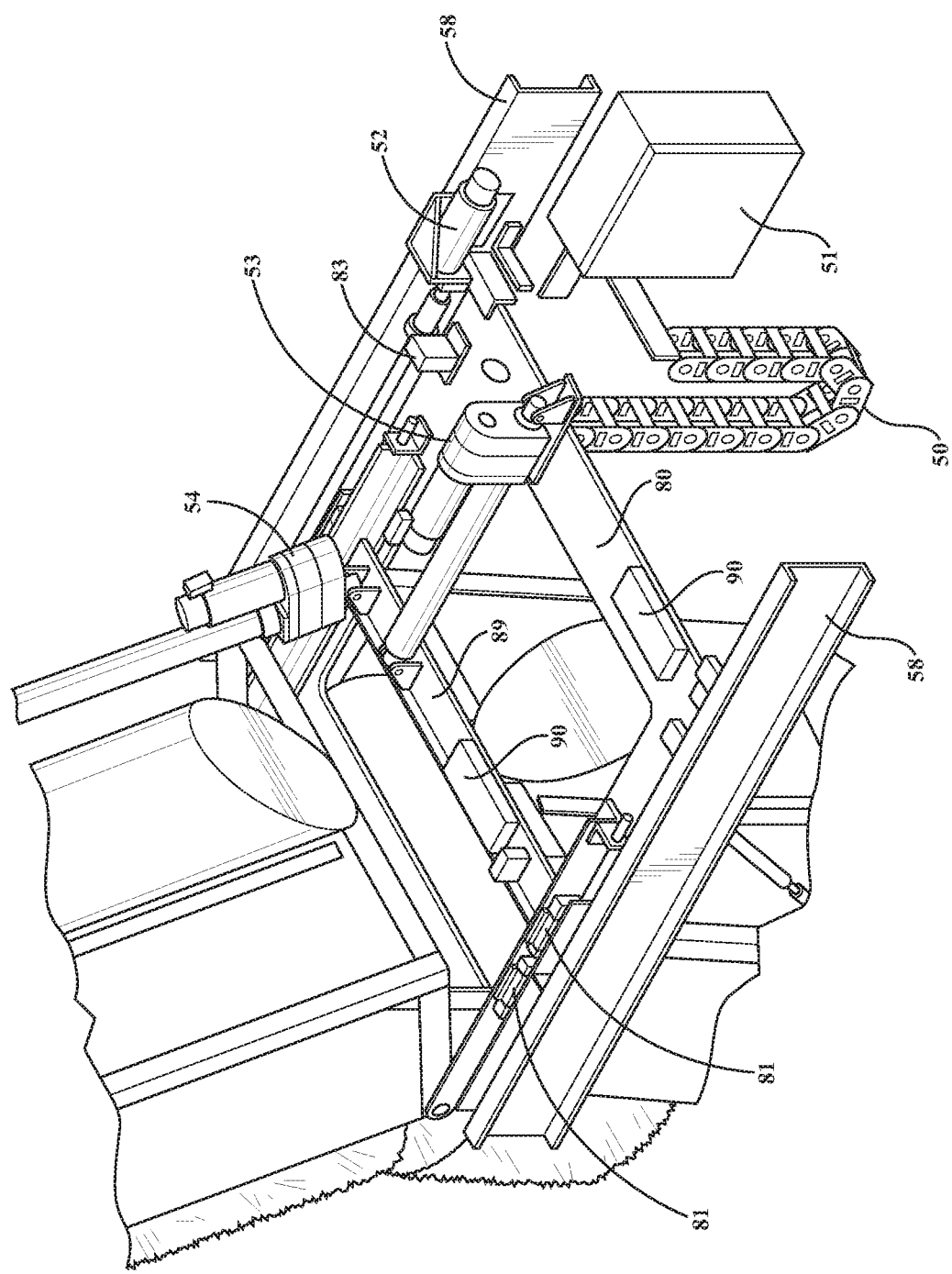
FIG. 8 is a perspective view of the Primary and Secondary Tray assemblies depicting relative placements of the actuators.

FIG. 8 is a perspective view of the Primary and Secondary Tray assemblies depicting relative placements of the actuators. The figure also shows the Remote IO Block 90, and the location of the CAT Track 50 and CAT Track Bracket 51. The Remote IO Block 90 is used to receive commands from a programmable logic controller and communicate electrical signals to the various electrical components through electrical conductors secured in the CAT Track 50. These signals then drive the actuators to a set of predefined locations based upon the vehicle being tacked-off in preparation for painting. In addition, the Remote IO Block 90 also captures sensor data including the Photo Eye 64 sensor and passes it along electrical conductors to an external monitoring unit. It will be appreciated by a skilled artisan that a part of, or all the commands and control facilitated with the electrical conductors may be replaced with wireless technologies. The class of Secondary Tray Actuator 53 and Tilt Actuator 54 utilized in the embodiment shown in illustration are Joyce Dayton 12" Actuator. The class of Primary Tray Actuator 52 utilized in this embodiment of the invention is Rockwell Servo Motor. A skilled artisan will appreciate that other classes of actuators may be used.

Figure 9:
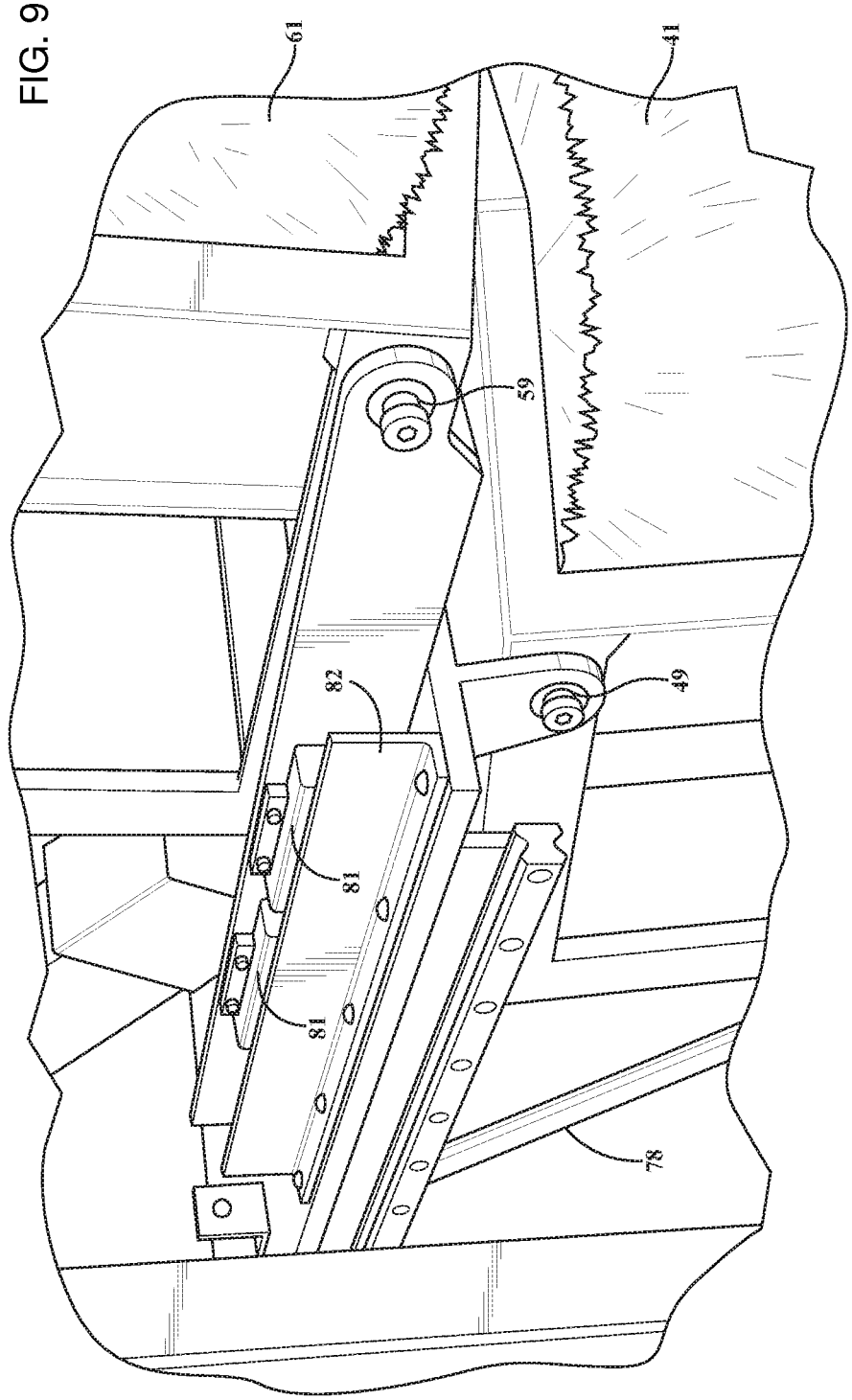
FIG. 9 depicts a view of the rail blocks sliding within the guide rails with the Upper Brush Assembly extended touch the vehicle body.

FIG. 9 depicts a view of the rail blocks sliding within the guide rails with the Upper Brush Assembly extended touch the vehicle body. The Secondary Tray Guide Rails 82 are shown to include a plurality of Rail Block 81 elements where the Secondary Tray Guide Rails 82 are attached to Primary Tray 80, and Rail Block 81 is attached to Secondary Tray 89. In this illustration, the Upper Brush Assembly 60 is distended farther than the Lower Brush Assembly 40 to prepare a vehicle with the upper body is somewhat farther away from the apparatus.

Figure 10:
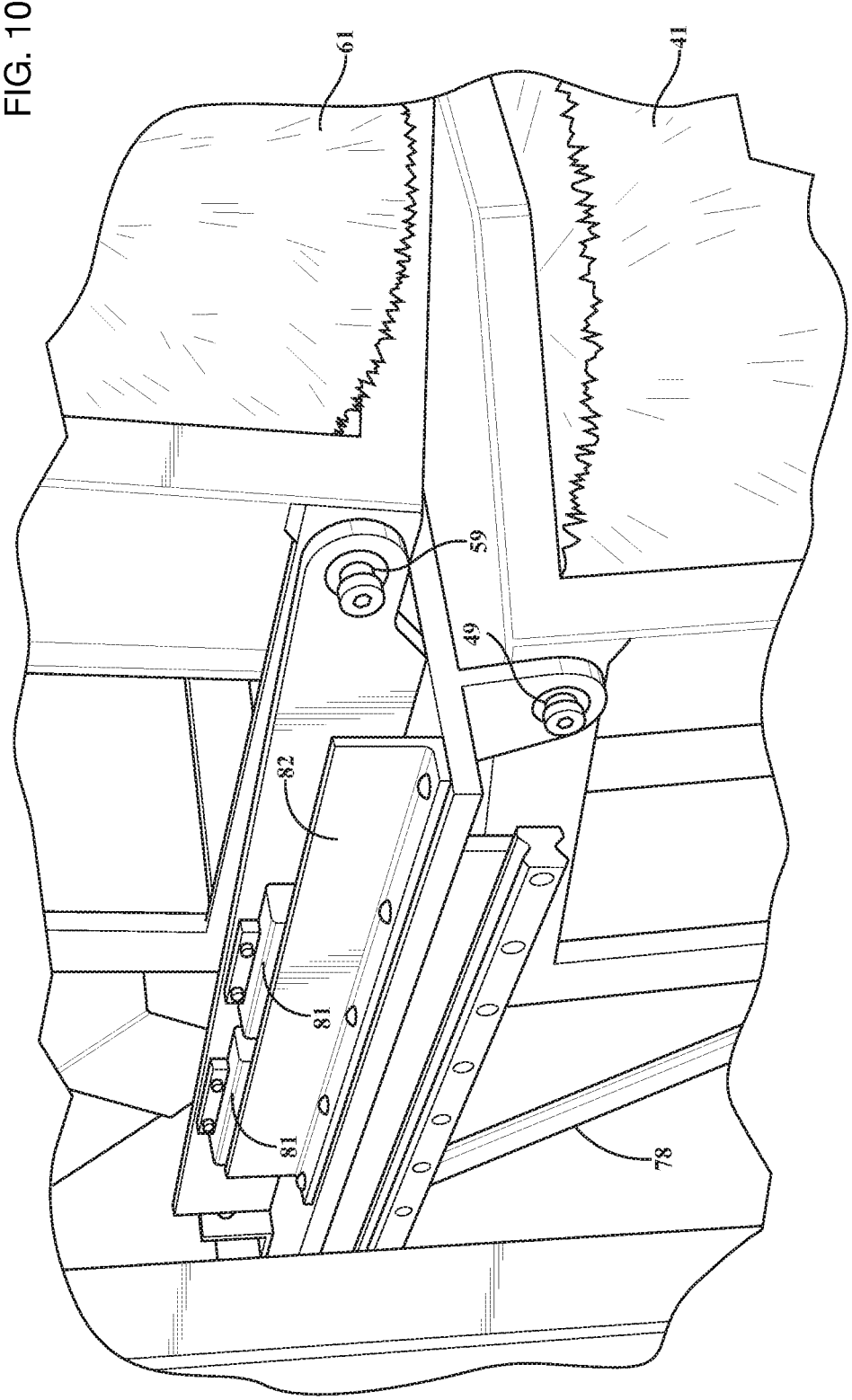
FIG. 10 similarly depicts a view of the rail blocks sliding within the guide rails with the Upper Brush Assembly retracted to accommodate a larger vehicle body.

FIG. 10 similarly depicts a view of the rail blocks sliding within the guide rails with the Upper Brush Assembly retracted to accommodate a larger vehicle body. In contrast to the previous illustration, the upper portion of the vehicle's side body is relatively large and does not require Upper Brush Assembly 60 to be extended so much. Hence the relative movement of the Secondary Tray 89 is not large with respect to Primary Tray 80.

Figure 11:
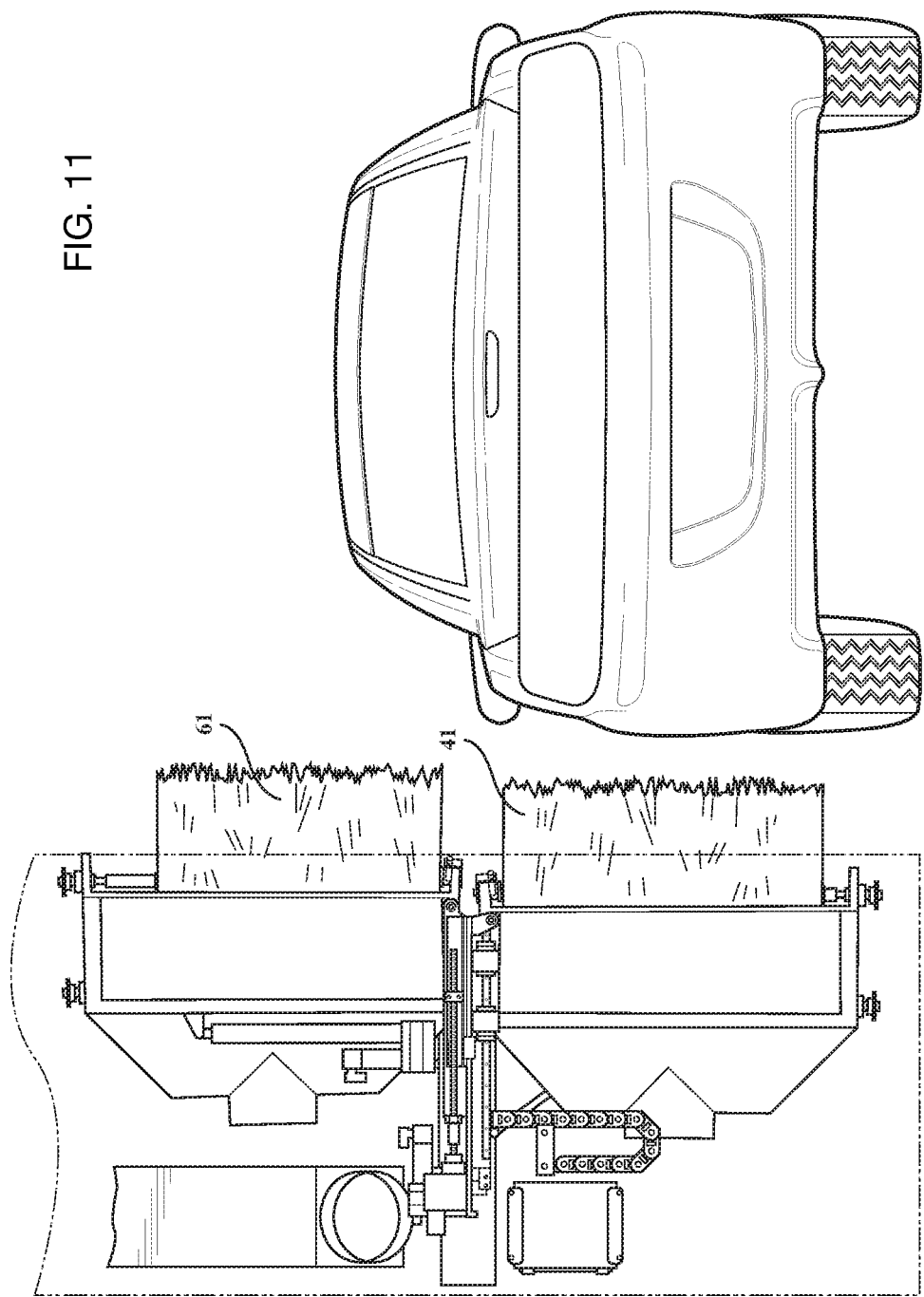
FIG. 11 depicts the relative configuration of a vehicle with the machine's brushes ready to be engaged.

FIG. 11 depicts the relative configuration of a vehicle with the machine's brushes ready to be engaged. In this illustration, the inline brushes are disposed with the relative movement along the Secondary Axis 76 with respect to the Primary Axis 75 being substantially close to zero.

Figure 12:
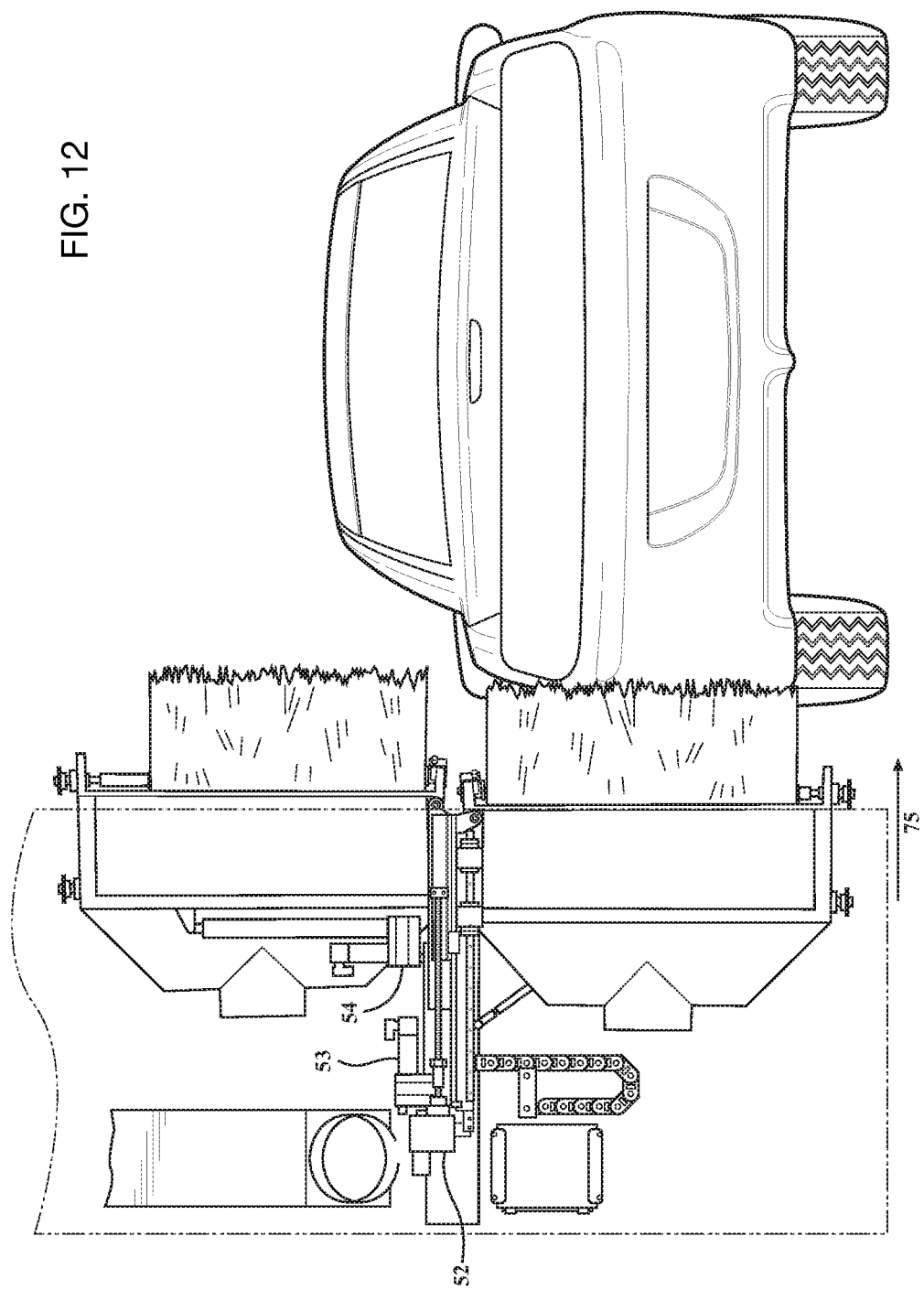
FIG. 12 illustrates the configuration of the machine with the Lower Brush Assembly engaged.

FIG. 12 illustrates the configuration of the machine with the Lower Brush Assembly engaged. The Lower Brush Assembly 40 is attached to the Primary Tray 80 which is moved by the Primary Tray Actuator 52 which moves it closer to the lower half of the vehicle body such that a firm contact is created between the Lower Brush 41 and the vehicle body with a crush zone of 1.5-2.5 inches. It should be noted that the Secondary Tray Actuator 53 adapted to move the Secondary Tray 89 is not engaged in the illustration and therefore the relative movement along the Secondary Axis 76 with respect to the Primary Axis 75 is substantially close to zero.

Figure 13:
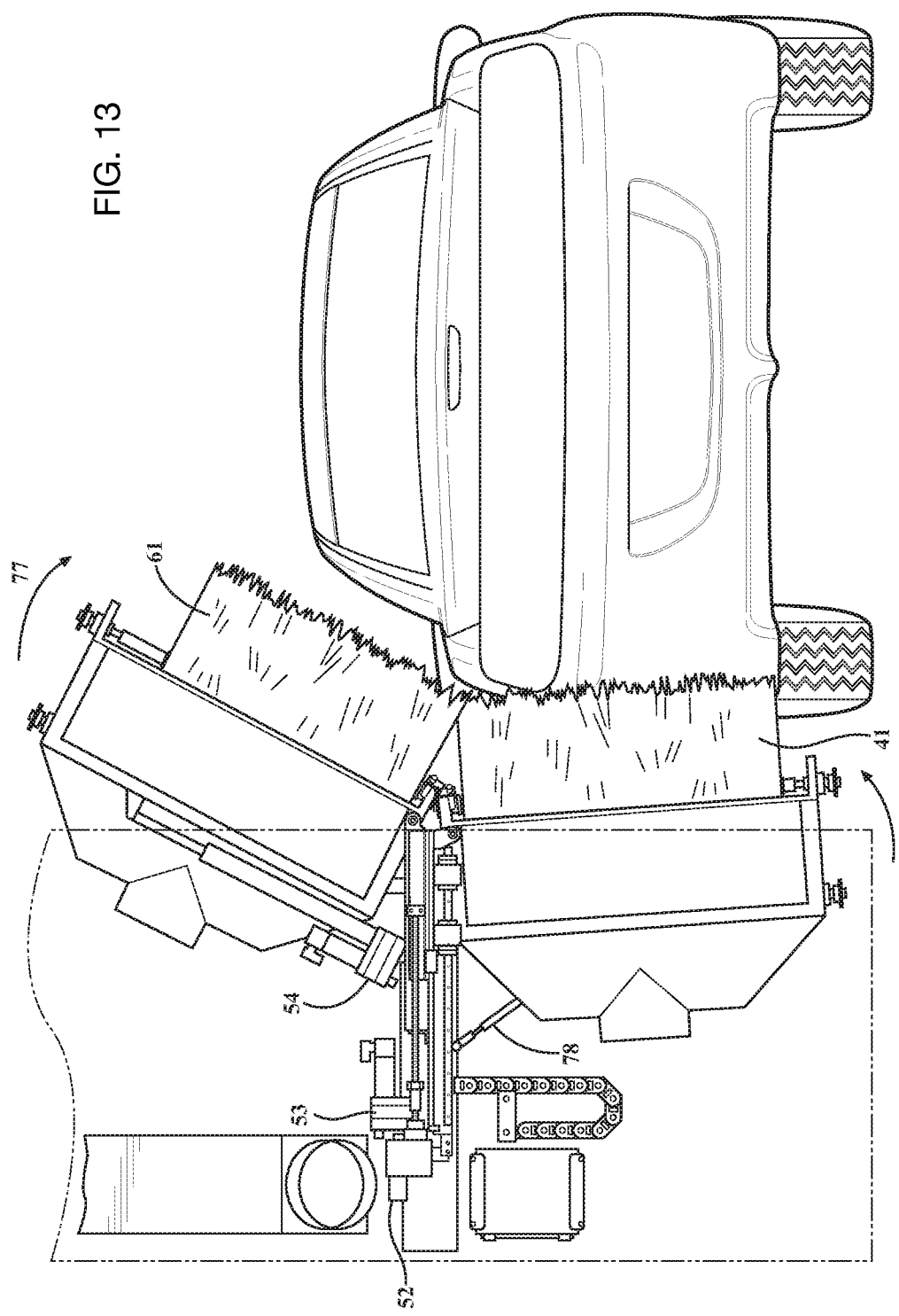
FIG. 13 illustrates the configuration with the Lower Brush Assembly engaged by further titling the turn buckle and the tilt angle of the Upper Brush Assembly aligned.

FIG. 13 illustrates the configuration with the Lower Brush Assembly engaged by further titling the turn buckle and the tilt angle of the Upper Brush Assembly aligned. The Tilt Actuator 54 has been engaged in this illustration and the Upper Brush Assembly 60 has been tilted towards the vehicle about the Upper Brush Assembly Pivot 59. In this manner the relative orientation of the Upper Brush 61 substantially mirrors the angle of the upper side cross section of the vehicle body. The illustration also shows the Lower Brush Assembly 40 has been titled about Lower Brush Assembly Pivot 49 by adjusting the length of Turn Buckle 78.

Figure 14:
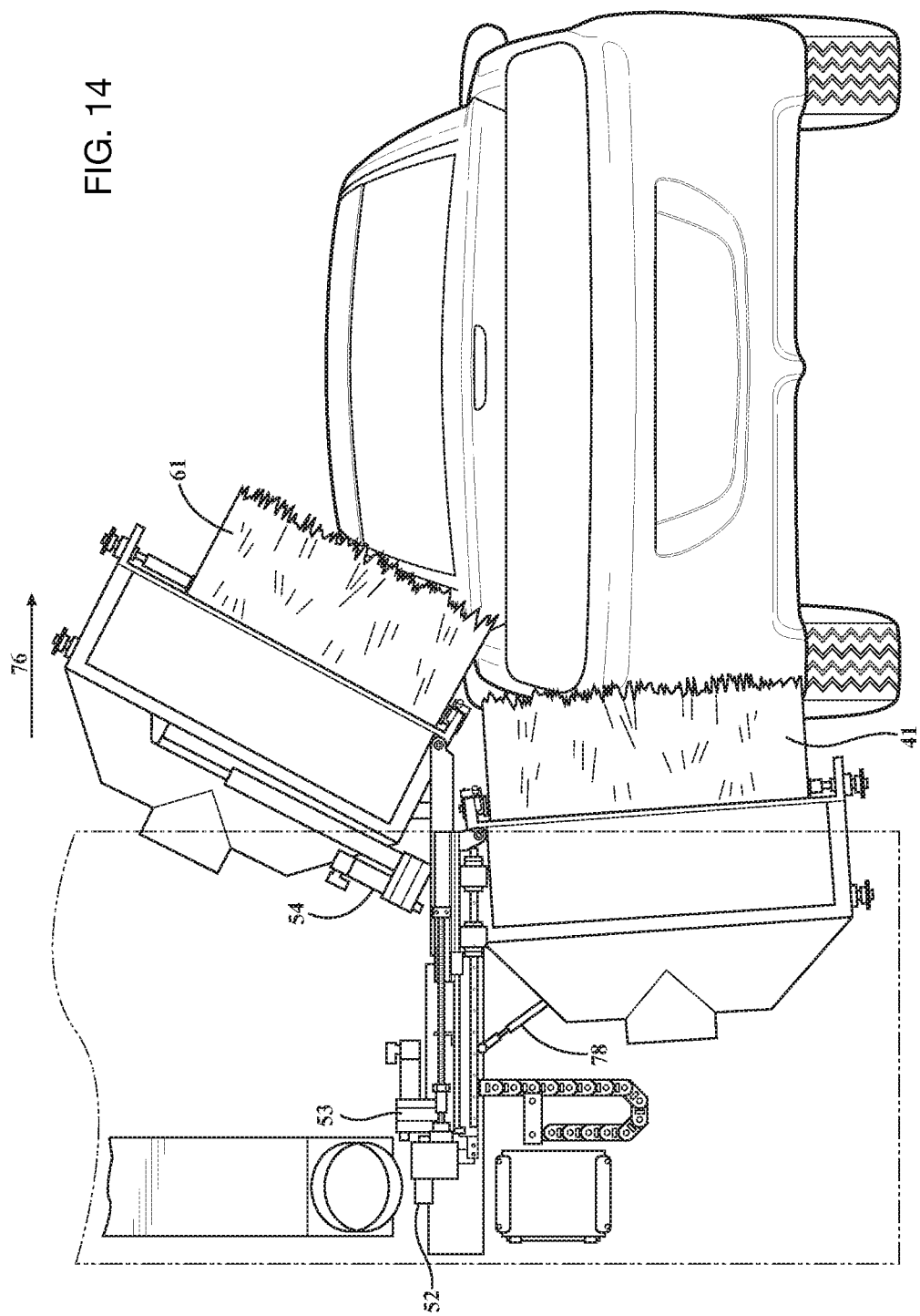
FIG. 14 shows the configuration of the machine with the Upper Brush Assembly further engaged by extending it out further until it meets the vehicle body.

FIG. 14 shows the configuration of the machine with the Upper Brush Assembly further engaged by extending it out further until it meets the vehicle body. In this illustration the Secondary Tray Actuator 53 is engaged to move the Upper Brush Assembly 60 along Secondary Axis 76 to make an effective contact with the vehicle such that a crush zone of 1.5-2.5 inches is created.

In an embodiment of the invention that the brushes spin against the flow of the vehicle for increasing the effectiveness of the tacking-off process. In an embodiment of the invention, sufficient the system maintains suction pressure to sustain a flow rate of 650-1000 cubic feet per minute. An embodiment of the invention is designed to occupy a footprint of 48" by 42" on the shop floor with a height of 10 feet when the apparatus is collapsed and packaged into its enclosure. It will be appreciated by one skilled in the art that the inline design offers a significant savings in the area compared to the space taken up by traditional tack-off machines.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A process of tacking-off using a machine, the process comprising the steps of:
   having a vehicle to be tacked off wherein the vehicle includes an upper side panel and a lower side panel,
   moving the lower brush assembly towards the lower side panel of the vehicle until any brushes in the lower brush assembly come in contact with the vehicle,
   tilting the upper brush assembly to align any brushes in the upper brush assembly with the upper side panel of the vehicle,
      wherein the brush in the upper brush assembly and the brush in the lower brush assembly are configured to be engaged and tack off the vehicle,
   moving the upper brush assembly towards the upper side panel of the vehicle until any brushes in the upper brush assembly come in contact with the vehicle,
   engaging the brush in the lower brush assembly and engaging the brush in the upper brush assembly.

2. A tack-off machine for automobile side panels, comprising
   an upper brush assembly including an upper brush rotatably attached to an upper spindle such that a rotational movement of the upper spindle causes a corresponding rotational movement of the upper brush wherein the upper brush is configured to clean an upper part of an automobile side panel,
   a lower brush assembly a lower brush rotatably attached to a lower spindle such that a rotational movement of the lower spindle causes a corresponding rotational movement of the lower brush wherein the lower brush is configured to clean a lower part of an automobile side panel, where
   the upper brush assembly and the lower brush assembly are vertically in line.

3. A machine as claimed in claim 2, with:
   the lower cleaning assembly including
      a lower hood having a shape substantially cylindrical with a top surface and a bottom surface, a lateral surface having a lower opening, and an axis with a lower spindle running along the axis,
      the lower brush assembly adapted to fit inside of the lower hood and where the lower brush is exposed through the lower opening;
   a lower exhaust in communication with the lower hood such that a passage exists from the lateral opening on the lower hood to the lower exhaust;
   the upper cleaning assembly including
      an upper hood having a shape substantially cylindrical with a top surface and a bottom surface, a lateral surface having an upper opening, and an axis with an upper spindle running along the axis,
      the upper brush assembly adapted to fit inside of the upper hood and where the upper brush is exposed through the upper opening;
      an upper exhaust in communication with the upper hood such that a passage exists from the lateral opening on the upper hood to the upper exhaust;
   a primary tray including a pivot and having an upper surface and a lower surface wherein the upper surface of the primary tray includes a plurality of guide rails;
   a secondary tray including a pivot and having an upper surface and a lower surface adapted to slide within the guide rails of the primary tray such that the lower surface of the secondary tray faces the upper surface of the primary tray; and where
      the lower brush assembly is rotatably attached to the primary tray pivot and disposed below the lower surface of the primary tray, and
      the upper brush assembly is rotatably attached to the secondary tray pivot and disposed above the upper surface of the secondary tray.

4. A machine of claim 3, where the primary tray is adapted to move along a primary axis, and the secondary tray is adapted to move along a secondary axis, further including
   a primary axis actuator connected to a primary linkage having a first end and a second end wherein
      the first end is fixedly attached to the primary axis actuator and the second end is fixedly attached to the primary tray,
      where a movement of the first end of the primary linkage creates a corresponding movement of the primary tray and the attached lower brush assembly;
   a secondary axis actuator connected to secondary linkage having a first end and a second end wherein
      the first end is fixedly attached to the secondary axis actuator and the second end is fixedly attached to secondary tray,
      where a movement of the secondary linkage creates a corresponding movement of the secondary tray and the attached upper brush assembly.

5. A machine of claim 3 wherein the upper brush assembly is adapted to tilt and a tilt actuator configured to change a length of a tilt linkage having a first end and a second end wherein
the first end is fixedly attached to the tilt actuator and the second end is fixedly attached to the upper brush assembly,
where the length change of the tilt linkage caused by the tilt actuator creates a rotation about the secondary tray pivot thereby changing the tilt of the upper brush assembly.

6. A machine of claim 3 wherein the upper brush assembly includes a photo-eye adapted to detect a distance of an object from the upper brush assembly.

7. A machine of claim 3 further comprising
a housing shaped substantially like a hollow rectangular prism having a pair of side surfaces each having an inside face and an outside face wherein
each of the inside face includes a primary guide rail fixedly attached thereto, and
a primary tray actuator fixedly attached to the housing;
a primary tray providing top surface and a bottom surface including
a front edge, a back edge, and two side edges where the two side edges are disposed opposite to each other, with side edges configured to glide inside the primary tray guide rail,
a primary tray linkage having primary tray linkage attached to the primary tray actuator and the second end of the primary linkage attached to the primary tray,
a plurality of hinges disposed along the primary tray where the hinges are adapted to accommodate a lower brush assembly, where
engaging the primary actuator is adapted to cause a movement of the primary tray along the primary guide rails;
a secondary tray actuator fixedly attached to the top surface of the primary tray,
a pair of secondary guide rails fixedly attached to the top surface of the primary tray;
a secondary tray configured to glide inside the secondary tray guide rail;
a plurality of hinges disposed on the secondary tray where the hinges are adapted to accommodate an upper brush assembly;
a secondary tray linkage having a first end and a second end wherein the first end of the secondary tray linkage is connected to the secondary tray actuator and the second end of the secondary tray linkage is connected to the secondary tray; where
engaging the secondary tray actuator causes a movement of the secondary tray inside the secondary guide rails.

8. A machine of claim 7 further includes a turn buckle having a length, a first end, and a second end, wherein the turn buckle is adapted to having a change in the length where,
the first end of the turn buckle is fixedly attached to the primary tray, and the second end of the turn buckle is rotatably attached to the lower brush assembly, and
the change in the length of the turn buckle causes a predetermined change in a rotation of the lower brush assembly about an axis created by the hinges on the primary tray.

9. A machine of claim 7 wherein the secondary tray further includes
a tilt actuator wherein the tilt actuator is fixedly attached to the secondary tray;
a tilt linkage having a first end and a second end wherein the first end is fixedly attached to the tilt actuator and the second end is fixedly attached to the upper brush assembly; where
engaging the tilt actuator causes the change of length of tilt linkage and a change in orientation of the upper brush assembly about a tilt axis created by the hinges on secondary tray.

10. A machine of claim 9 wherein the primary actuator, the secondary actuator and the tilt actuator are controlled by a computer program to correspondingly adjust the position of the primary tray along the primary axis, the secondary tray along the secondary axis, and the upper brush assembly orientation along the tilt axis.

11. A machine as claimed in claim 2 where the upper cleaning assembly further includes an upper rotary brush, and the lower cleaning assembly further includes a lower rotary brush.

12. A machine as claimed in claim 11 wherein the upper rotary brush and the lower rotary are located proximate to each other and disposed to touch each other.

13. A machine as claimed in claim 2 comprising a primary movable mounting, with the lower cleaning assembly being mounted thereto, and a secondary mounting mounted movably to the primary movable mounting, the upper cleaning assembly being mounted thereto the secondary mounting.

14. A machine as claimed in claim 2 comprising an upper hood for the upper cleaning assembly and a lower hood for the lower cleaning assembly wherein both the upper hood and the lower hood are configured to be housed within a common housing such as an outer cover.

15. A machine as claimed in claim 14, wherein the housing has a single outlet hose able to serve as a conduit for extraction from both the upper hood and the lower hood.

16. A tack off process comprising the steps of
having an upper brush assembly comprising of rotatable upper brush attached to an upper spindle where the upper brush assembly is configured to tack off debris from an upper side panel of an automobile,
having a lower brush assembly comprising of rotatable lower brush attached to a lower spindle where the lower brush assembly is configured to tack off debris from a lower side panel of an automobile,
having the upper brush assembly and the lower brush assembly positioned vertically in-line,
positioning an automobile with the upper brush in contact with an upper side panel of the automobile, and with lower brush in contact with lower side panel of the automobile,
causing the upper spindle and lower spindle to simultaneously rotate and thereby respectively causing a corresponding rotational movement of the upper brush and the lower brush.

* * * * *